Oct. 2, 1923.

A. E. SILANDER 1,469,449

BRUSH MAKING MACHINE

Filed July 25, 1921

3 Sheets-Sheet 1

Inventor:
Arthur Efraim Silander.

Oct. 2, 1923.

A. E. SILANDER 1,469,449

BRUSH MAKING MACHINE

Filed July 25, 1921    3 Sheets-Sheet 2

Inventor:

Arthur Efraim Silander.

Oct. 2, 1923.

A. E. SILANDER

BRUSH MAKING MACHINE

Filed July 25, 1921 3 Sheets-Sheet 3

1,469,449

Inventor:
Arthur Efraim Silander

Patented Oct. 2, 1923.

1,469,449

UNITED STATES PATENT OFFICE.

ARTHUR EFRAIM SILANDER, OF BERLIN, GERMANY.

BRUSH-MAKING MACHINE.

Application filed July 25, 1921. Serial No. 487,482.

*To all whom it may concern:*

Be it known that I, ARTHUR EFRAIM SILANDER, a citizen of the Republic of Finland, residing at Berlin, Germany, have invented certain new and useful Improvements in Brush - Making Machines (for which I have filed applications in Germany, October 13, 1919; Germany, December 13, 1919; Finland, December 20, 1920), of which the following is a specification.

The present invention relates to a brush and like making machine of the kind in which the bristles are introduced into a vibratory distributing hopper and paralleled in the latter by means of sieves and vertical delivery channels which feed them into a template supported on a reciprocating table.

The object of the invention is to increase the efficiency of the machine, and the invention consists essentially in the provision of a plate arranged so as to sweep the template when the latter moves in one direction and pack the bristles into the slots, a cam being arranged near the plate so as to sweep the remaining bristles from the surface of the template when the latter moves in the opposite direction.

Figure 1:
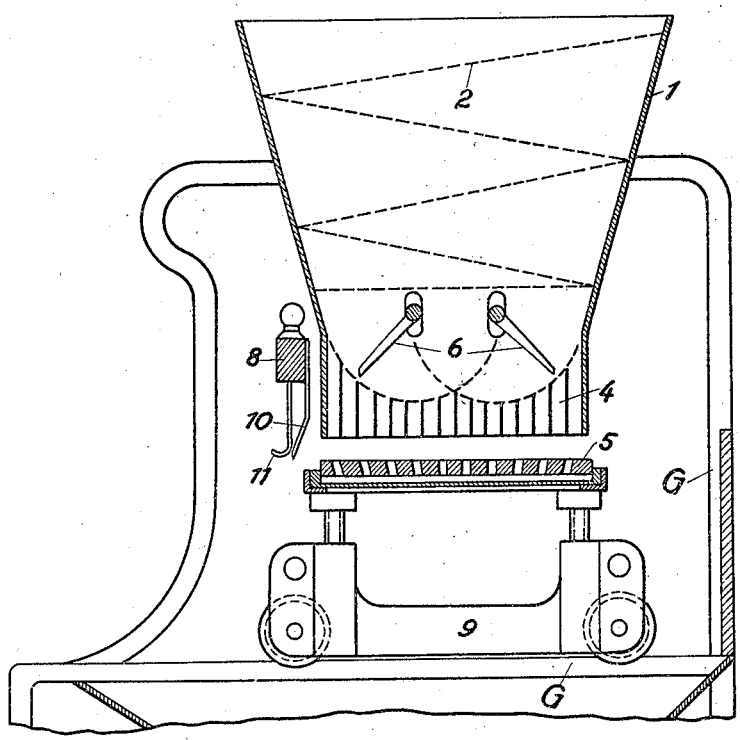
Figure 2:
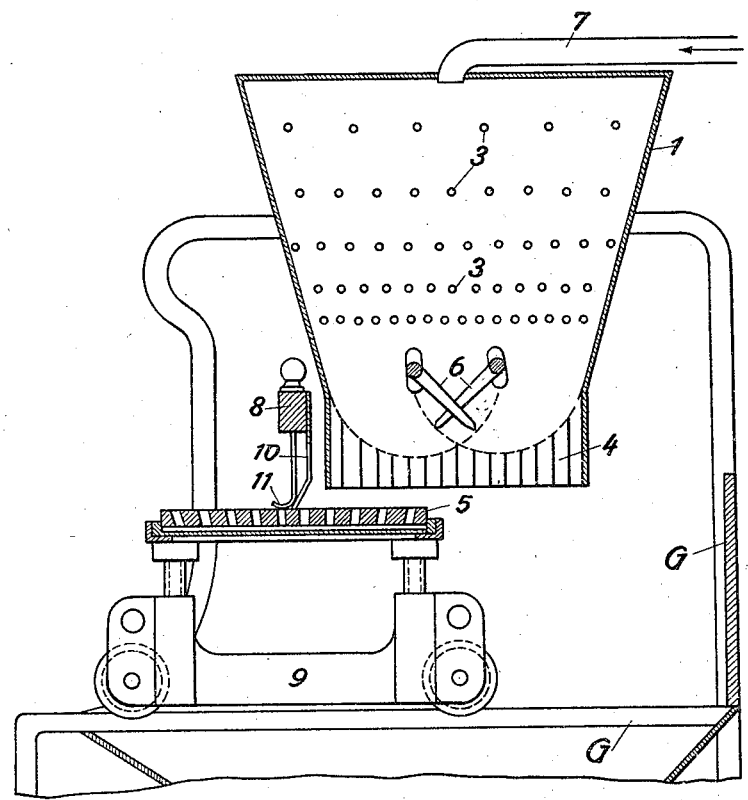
Figure 3:
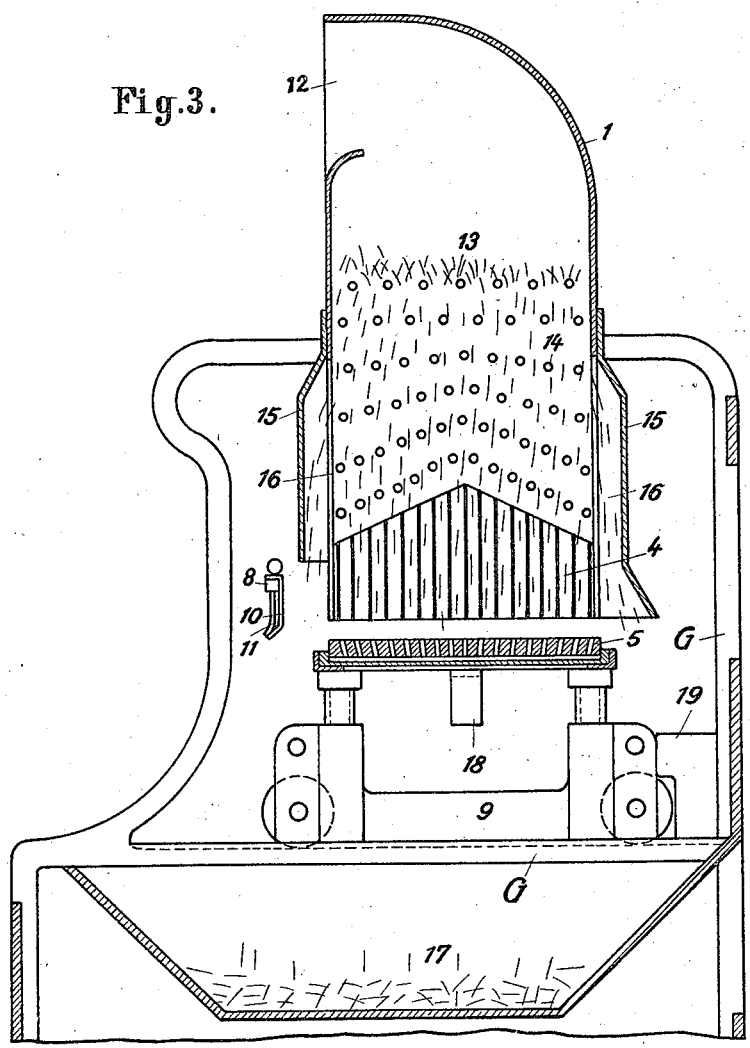

In the accompanying drawings the invention is illustrated by way of example,

Fig. 1 representing a vertical section of the distributing hopper and template according to one form of construction, Fig. 2, a similar view of a modified construction, and Fig. 3, a view of a further modification.

Figure 4:
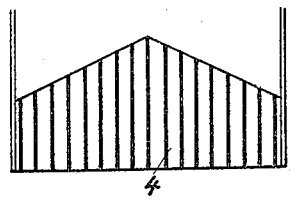
Figure 5:
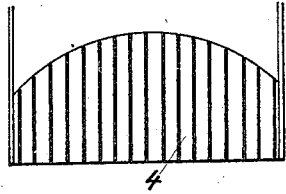

Figs. 4 and 5 show different arrangements of the delivery channels.

The bristles are fed into a distributing hopper 1 which according to Fig. 1 is fitted with a plurality of inclined sieves or screens 2 of which the upper ones are coarser than those underneath. The hopper is shaken in known manner so as to cause the bristles to fall through the sieves and, in so doing, to arrange themselves parallel to each other. At the bottom of the hopper there is a plurality of channels 4 formed by vertical partitions. These channels receive the paralleled bristles and deliver them into slots in a template 5 which is carried by a reciprocating table 9 guided in the machine frame G. Arranged in known manner inside the hopper are two vanes 6 which, during the shaking of the hopper, are caused to rock about their shafts so as to stir the bristles and keep them more or less suspended and free to adjust themselves for passing through the sieves and channels.

A cross-piece 8 in the machine frame holds a plate 10 and a comb 11 arranged so as to sweep the template 5 when the latter is moved by means of the carriage. When the template moves away from the hopper, the plate 10, which is inclined away from the movement, packs the crowded bristles into the slots of the template, and when the latter moves in the opposite direction, the comb 11 sweeps away the remaining bristles from the surface thereof.

Fig. 2 shows how, in addition to the currents set up by the fans 6, air under pressure may be introduced through a pipe 7 for agitating the bristles. Moreover, the sieves are formed by wires 3 which are strung in rows at gradually decreasing distances apart.

According to Fig. 3, the distributing hopper is provided with an inlet opening 12. There are also, at the lower part of the hopper, openings 16 through which non-paralleled bristles can be discharged so as not to obstruct the channel passages. For this purpose there is, underneath a series of straight rows of paralleling wires 13, a series of roof-shaped rows 14 which guide transversely disposed bristles to the opening 16. The latter are covered by offset plates 15 which guide the discharged bristles into a tray 17 whence they can be reintroduced into the hopper 1. The partitions forming the channels 4 are also sized and arranged so as to form roof-shaped guides, either pointed as shown in Figs. 3 and 4 or domed as shown in Fig. 5, for leading transversely disposed bristles into the tray 17.

To facilitate the feeding of the bristles into the template 5, the latter may be shaken either by means of an oscillating hammer 18 or by knocking the carriage 9 against a buffer 19.

I claim:—

1. In a brush and like making machine, a bristle-distributing hopper, sieves arranged in said hopper so as to pass and parallel the bristles, partitions forming vertical channels at the bottom of the hopper for delivering the paralleled bristles, a slotted template arranged so as to receive the paralleled bristles into its slots from the channels, guides on which the template can be reciprocated in its own plane, a plate arranged so as to sweep the template when the latter moves in one direction and pack the bristles into the slots, and a comb arranged so as to sweep the remaining bristles from the surface of the template when the latter moves in the opposite direction, substantially as set forth.

2. In a brush and like making machine, a bristle-distributing hopper having lateral discharge apertures, sieves arranged in said hopper so as to pass and parallel the bristles, partitions forming vertical channels at the bottom of the hopper for delivering the paralleled bristles, the sieves and the upper edge outline of the partitions being roof-shaped so as to pass transversely disposed bristles through the discharge openings, a slotted template arranged so as to receive the paralleled bristles into its slots from the channels, guides on which the template can be reciprocated in its own plane, a plate arranged so as to sweep the template when the latter moves in one direction and pack the bristles into the slots, and a comb arranged so as to sweep the remaining bristles from the surface of the template when the latter moves in the opposite direction, substantially as set forth.

3. In a brush and like making machine, a bristle-distributing hopper having lateral discharge openings, sieves arranged in said hopper so as to pass and parallel the bristles, partitions forming vertical channels at the bottom of the hopper for delivering the paralleled bristles, the sieves and the transverse top outline of the partitions being roof-shaped so as to lead transversely disposed bristles to the discharge openings, offset plates covering said discharge openings so as to guide the discharged bristles, a slotted template arranged so as to receive the paralleled bristles into its slots from the channels, guides on which said template can be reciprocated in its own plane, a plate arranged so as to sweep the template when the latter moves in one direction and pack the bristles into the slots, and a comb arranged so as to sweep the remaining bristles from the surface of the template when the latter moves in the opposite direction, substantially as set forth.

ARTHUR EFRAIM SILANDER.